W. P. LOUDON.
MICROMETER MECHANISM.
APPLICATION FILED FEB. 20, 1920.

1,401,621.

Patented Dec. 27, 1921.

WITNESSES:
H. T. Shelhamer
W. B. Wells

INVENTOR
Warren P. Loudon
BY
Chesley G. Carr
ATTORNEY

UNITED STATES PATENT OFFICE.

WARREN P. LOUDON, OF EDGEWOOD PARK, PENNSYLVANIA, ASSIGNOR TO WESTINGHOUSE ELECTRIC & MANUFACTURING COMPANY, A CORPORATION OF PENNSYLVANIA.

MICROMETER MECHANISM.

1,401,621.   Specification of Letters Patent.   Patented Dec. 27, 1921.

Application filed February 20, 1920. Serial No. 360,030.

*To all whom it may concern:*

Be it known that I, WARREN P. LOUDON, a citizen of the United States, and a resident of Edgewood Park, in the county of Allegheny and State of Pennsylvania, have invented a new and useful Improvement in Micrometer Mechanisms, of which the following is a specification.

My invention relates to micrometer mechanisms and particularly to micrometer mechanisms for ignition systems to adjust the positions of the timing shafts.

One object of my invention is to provide a mechanism of the above-indicated character that shall not only serve to join the timing shaft to the driving shaft in an efficient manner but shall also effect an accurate angular adjustment of the two shafts relative to each other.

In many devices, it is essential to accurately adjust the angular position of one shaft relative to the position of a second alined shaft without effecting any longitudinal movement of either shaft. Thus, in an ignition system for an automobile, it is essential to accurately adjust the position of the distributer cam member and the timing shaft relative to the position of the driving shaft which is connected to the automobile engine. Inasmuch as very minute changes in the position of the timing shaft are very often required to adjust the spark, some special means is desirable to adjust such position.

In a mechanism constructed in accordance with my invention, the shaft which operates the distributer and timing mechanism is connected to a driving shaft by means of a micrometer mechanism which permits an accurate adjustment of the two shafts relative to each other. The timing shaft, in the preferred form of my invention, is provided with screw threads near the end portion adjacent to the driving shaft, and the driving shaft is provided with screw threads which have a different pitch from the threads on the timing shaft. A sleeve member, which is screw-threaded in accordance with the threads on the two shafts, serves to join the two shafts and to effect an accurate adjustment of the two shafts relative to each other. Inasmuch as the threads on the two shafts are cut in the same direction and have different pitches, it is apparent that, if relative longitudinal movements of the shafts are prevented and the sleeve member is given a movement of rotation, the timing shaft is given a small movement of rotation relative to the driving shaft connected to it.

Figure 1:
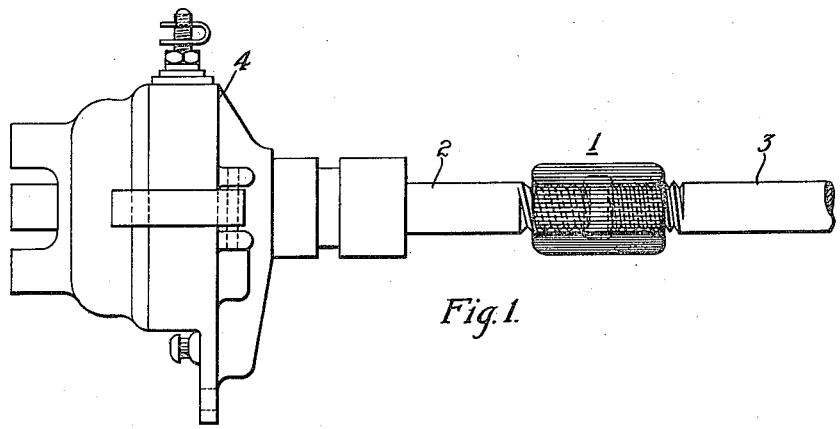
Figure 2:
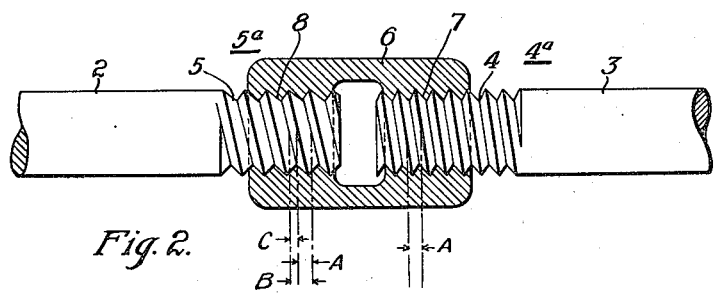
Figures 3, 4:
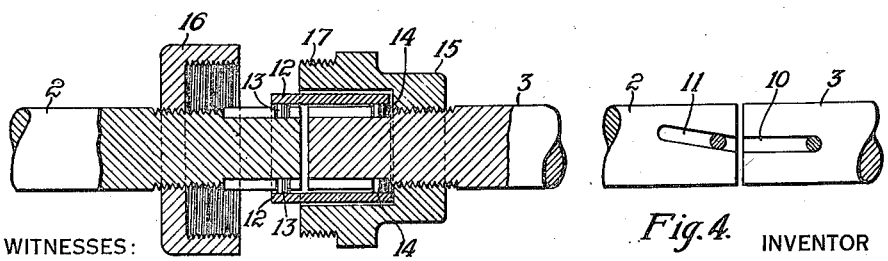

In the accompanying drawing, Figure 1 is a view of a distributer mechanism and a timing mechanism provided with a micrometer mechanism constructed in accordance with my invention; Fig. 2 is an enlarged view of the micrometer mechanism shown in Fig. 1, and Figs. 3 and 4 are views of a modification of my invention.

Referring to Figs. 1 and 2 of the drawing, a micrometer mechanism 1 is provided for joining a timing shaft 2 to a driving shaft 3. The driving shaft is connected, in any suitable manner, to an automobile engine (not shown), and the timing shaft 2 is connected to a combined distributing and timing mechanism 4 which may be of any suitable character, such, for example, as that of the mechanism disclosed in a copending application of Albert H. Packer, Serial No. 352,740, filed Jan. 20, 1920, and assigned to the Westinghouse Electric & Manufacturing Company.

The end portion 4ª of the driving shaft 3 has screw threads 4 of any suitable pitch, having a distance A between threads. The timing shaft 2 has screw threads 5 cut on the end portion 5ª adjacent to the driving shaft 3. The angle of the threads 5 is preferably greater than the angle of the threads 4, making the distance B between threads a distance C greater than the distance A between threads on the threaded portion 4ª. If so desired, the angle of the threads 5 may be made less than the angle of the threads 4.

A split sleeve 6 is provided with a screw-threaded portion 7 having threads of the same pitch as the threads 4, and a portion 8 having threads of the same pitch as the threads 5. The sleeve 6 is fitted to the threaded portions 4ª and 5ª of the shafts 3 and 2 not only to join the two shafts but also to adjust the position of the timing shaft 2 relative to the driving shaft 3.

It may be assumed that the two shafts 2 and 3 are so fixed as to prevent any axial movement of either shaft and the threaded portions 4ª and 5ª to be provided with threads of relatively steep pitch. An adjustment of the timing shaft relative to the driving shaft may be obtained by rotating the sleeve 6. A complete rotation of the sleeve 6 on the driving shaft 3 will advance the sleeve 6 a distance A. The threads on the timing shaft 2 are cut in the same direction as the threads upon the driving shaft 3 and, accordingly, the sleeve 6 will advance a distance A along the shaft 2. However, the sleeve 6 will be unable to effect a complete rotation relative to the timing shaft 2 inasmuch as the distance B between threads on the threaded portion 5ª is greater by a distance C than the distance A between threads on the threaded portion 4ª. Consequently, the timing shaft 2 will be rotated with the sleeve to make allowance for the distance C. Thus, it is apparent that a rotative movement of the sleeve 6 will cause a small rotation of the timing shaft 2 relative to the driving shaft 3 without effecting any longitudinal movement of the shafts 2 and 3. Moreover, after adjustment of the two shafts, a positive drive is secured through the sleeve 6.

Referring to Figs. 3 and 4, the driving shaft 3 is provided with slots 10 which are parallel to the axis of the shaft, and the timing shaft 2 is provided with slots 11 which extend at any suitable angle to the axis of the timing shaft. A sleeve 12 is provided with pins 13 and 14 which are adapted to operate in the slots 11 and 10 of the shafts 2 and 3. An adjusting nut 15, which surrounds the sleeve 12, is threaded to the driving shaft 3 adjacent to the slots 10. A locking collar 16 is threaded to the timing shaft 2 adjacent to the slots 11 and is adapted to lock the sleeve 12 and the nut 15 in any such position by engaging a threaded portion 17 upon the nut 15.

In case it is desired to adjust the timing shaft 2 relative to the driving shaft 3, the adjusting nut 15 is rotated on the driving shaft 3 to move the sleeve 12 longitudinally in the one or the other direction, according to the adjustment desired. Longitudinal movement of the sleeve 12 effects relative rotative movement of the shafts 2 and 3 by the camming action of the pins 13 on the sides of the slots 11. When the shafts 2 and 3 have been adjusted to the desired extent, the locking collar 16 is connected to the nut 15 to prevent any further movement of the timing shaft 2 relative to the driving shaft 3.

Modifications in the mechanism may be made within the spirit and scope of my invention and such modifications are intended to be covered by the appended claims.

I claim as my invention:

1. In a micrometer mechanism for an ignition device, the combination with a timing shaft having a threaded end portion, of a driving shaft having threads on the end portion thereof adjacent to said timing shaft, the threads on the respective shafts extending in the same direction, said threads on the driving shaft having a different pitch from that of the threads on the timing shaft, and a threaded sleeve member coacting with said end portions and serving to rotatably adjust the timing shaft relative to the driving shaft.

2. In a micrometer mechanism for an ignition device, the combination comprising a timing shaft, a driving shaft and a sleeve member joined to said shafts by threads extending in the same direction but having different pitches for connecting said shafts and for rotatively adjusting the timing shaft relative to the driving shaft.

3. In a micrometer mechanism, the combination comprising two shafts and means for adjusting the angular relation of said shafts, said means comprising a sleeve connected to said shafts by screw threads extending in the same direction but having different pitches.

4. In a micrometer mechanism, the combination comprising two shafts having screw threads of different pitches on adjacent end portions, said threads extending in the same direction, and a sleeve fitted to said threaded end portions and serving to adjust the angular relation of said shafts.

5. In a micrometer mechanism for an ignition device, the combination comprising a timing shaft, a driving shaft, and means for joining said shafts, said means, when actuated tending to angularly adjust the timing shaft relative to the driving shaft in opposite directions to different degrees.

6. In a micrometer mechanism for an ignition device, the combination comprising a timing shaft having screw threads on the end portion thereof, a driving shaft having screw threads on the end portion adjacent to the timing shaft, the threads on said shafts having different pitches and extending in the same direction, and a sleeve member fitted to the threads on said shafts.

7. In a micrometer mechanism for an ignition device, the combination with a timing shaft having screw threads on an end portion thereof, and a driving shaft alined with said timing shaft and having screw threads on an end portion in the same direction as the threads on the timing shaft, the threads on the timing shaft having a higher pitch than the threads on the driving shaft, of a sleeve member fitted to said threaded end portions and serving to rotatively adjust the position of the timing shaft relative to the driving shaft.

8. In a micrometer mechanism for an ignition device, the combination with a timing and a driving shaft, of a sleeve member joined to one of said shafts which, when rotated, has a cam action to effect a minute relative rotative movement of said shafts.

9. In a micrometer mechanism for an ignition device, the combination with a timing and a driving shaft, of means comprising a rotatable sleeve member, for effecting a relative rotative movement of said shafts of less degree than its own rotative movement.

In testimony whereof I have hereunto subscribed my name this second day of February, 1920.

WARREN P. LOUDON.